United States Patent [19]
Adlhart et al.

[11] 3,716,416
[45] Feb. 13, 1973

[54] FUEL METERING DEVICE FOR FUEL CELL

[75] Inventors: Otto J. Adlhart, Newark; Peter L. Terry, Madison, both of N.J.

[73] Assignee: Engelhard Minerals & Chemicals Corporation

[22] Filed: May 20, 1971

[21] Appl. No.: 145,287

[52] U.S. Cl. .................................... 136/86 B, 75/15
[51] Int. Cl. ............................................ H01m 27/00
[58] Field of Search .................... 136/86; 75/15, 194

[56] References Cited

UNITED STATES PATENTS

| | | | |
|---|---|---|---|
| 3,321,334 | 5/1967 | Palmer | 136/86 R |
| 3,228,797 | 1/1966 | Brown et al | 136/86 R |
| 3,222,223 | 12/1965 | Platner | 136/86 C |
| 3,499,797 | 3/1970 | Hooper | 136/86 C |

Primary Examiner—Winston A. Douglas
Assistant Examiner—H. A. Feeley
Attorney—Miriam W. Leff and Samuel Kahn

[57] ABSTRACT

A fuel cell system designed for self-regulated power output at a predetermined level includes a capillary flow control device for throttling the fuel flow in response to the power output of the fuel cell.

4 Claims, 4 Drawing Figures

PATENTED FEB 13 1973

INVENTORS *OTTO J. ADLHART*
*PETER L. TERRY*
BY
*Miriam N. Leff*
ATTORNEY

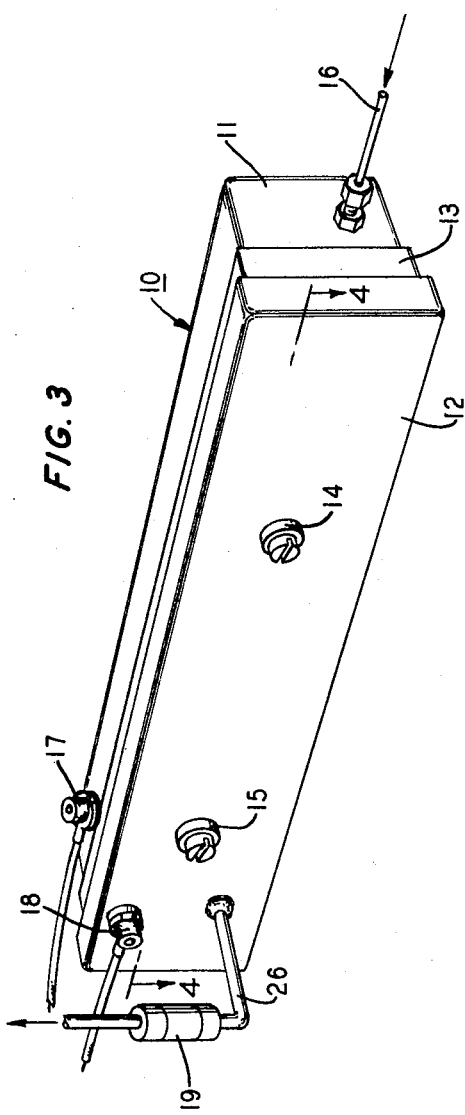
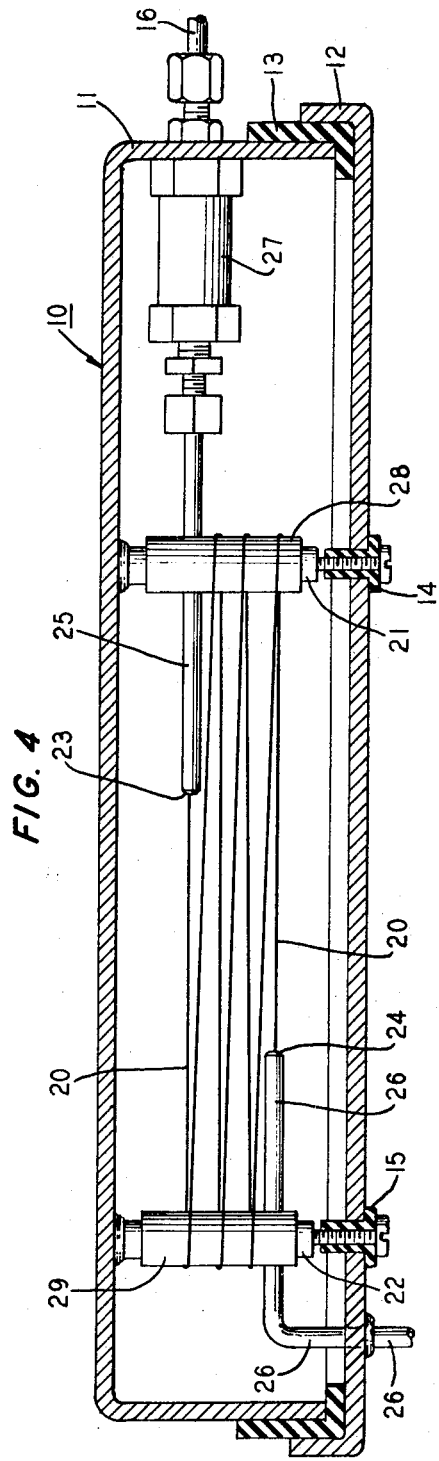

FUEL METERING DEVICE FOR FUEL CELL

BACKGROUND OF THE INVENTION

This invention concerns a method and device for throttling the flow of relatively small amounts of fluids in a fuel cell system. It is particularly concerned with providing a simple, reliable means for automatically controlling the fuel feed in a fuel cell system designed for self-regulated power output.

Many types of valves are commercially available for controlling the flow of liquids and gases. These known devices cannot be used for accurately regulating relatively small flows, i.e. flows of the order of about 1 to 100 cubic centimeters per minute.

This problem of flow control of relatively small flows is encountered in the operation of certain fuel cell systems. In one well-known type of fuel cell, the fuel is fed as a gas to the fuel electrode from an outside source where it is stored as a liquid. The fuel may be, for example, propane or ammonia stored under pressure, a light hydrocarbon such as naphtha, or it may be a free-hydrogen containing gas which is generated, e.g. from the hydrocarbon or ammonia, in an auxiliary generator. As noted above, the valves presently available do not provide the accuracy and reliability in such systems where the fuel requirements may be of the order of 30 $cm^3/min$. of liquid $NH_3$ for a cell supplying 500 watts of power. One way to regulate the fuel is by a motor driven pump. This is not entirely satisfactory in that the motors require electricity — produced by the fuel cell or an outside source — and this results in an overall loss in efficiency in the system. In U.S. Pat. No. 3,462,308 a gas initially under high pressure is injected into a closed gas conduit in communication with the fuel supply side of the electrode by vaporizing a small portion of the liquid in a capillary in order to cause the gas in the closed gas circuit to circulate. However, in this patent, which involves an alkaline fuel cell operating below the boiling point of water, the fuel feed automatically increases in response to the increase in power output of the cell.

In a cell where it is desired to automatically regulate the output at some predetermined value by regulating the fuel feed, the problem is different. For example, when the output of the cell drops below a particular point, the amount of fuel delivered to the cell must be increased to bring up the output. Conversely, when the output exceeds a predetermined point, the amount of fuel must be decreased to lower the output.

The principal object of the present invention is to provide a device by which the flow of small amounts of fluids can be controlled, particularly, throttled. Another object is to provide an automatic device for regulating the fuel feed to a fuel cell system which is accurate, reliable, requires minimum care and maintenance, and operates without lowering the electrical efficiency of such system.

In accordance with this invention, a simple reliable device is provided for accurately controlling the flow of relatively small amounts of fluids. The device uses no moving parts. It is adaptable for use in controlling low fuel feed required in certain fuel cells, and particularly useful for cells intended for unattended operation for long periods of time in remote areas.

THE INVENTION

Briefly, the fluid flow device of this invention is comprised of one or more capillary tubes and means to regulate the temperature of such capillaries. The control of the flow is provided by a method comprising passing the fluid through a capillary and heating or cooling the capillary to alter the rate of flow through the capillary as desired. Increase in temperature throttles flow through the capillary and decrease in temperature increases the flow rate. The length and diameter of the capillary used depends on the desired flow rate for a particular system. This relationship is given in and can be calculated from Poiseuille's equation, which can be found in any standard engineering handbook, such as Perry's CHEMICAL ENGINEERS' HANDBOOK.

It will be noted that capillary flow meters have been used for the measurement of relatively small flows of fluids. To make such determination, the devices have been used to measure pressure drop at a constant temperature and pressure, and from this measurement the flow rate of the fluid is calculated. This is explained in an article by C. E. Greeff and J. R. Hackman on "Capillary Flow Meters" in ISA Journal, Aug. 1965, pp. 75 to 78 (of the Instrument Society of America).

The present invention will be more fully understood from the description of the preferred embodiments and the drawings given below.

THE DRAWINGS

FIG. 3 shows the electrical and fuel connection in a capillary metering device used in a fuel cell in accordance with this invention. The capillary tubing is contained in the housing.

FIG. 4 is a cross-section of the housing along lines 4—4 and shows the capillary tubing and filter arrangement in the device.

Figure 1:
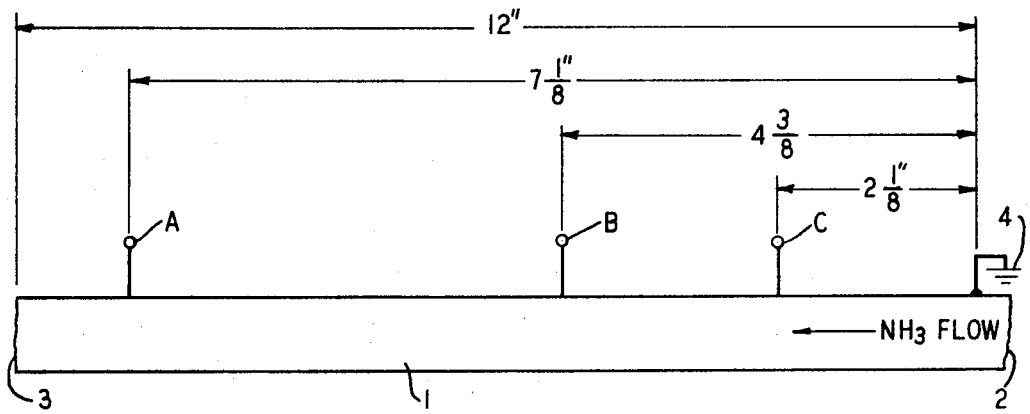
FIG. 1 shows a diagram of electrical connections in an experimental capillary tube device used to demonstrate the present invention. The device is described in detail in Example 1.

Referring to FIGS. 3 and 4 which illustrate a capillary metering device 10 in accordance with this invention, the capillary tubing 20 is a 8 ½ feet long 304 stainless steel tube 0.014 inch O.D. × 0.006 inch I.D. wound on posts 21 and 22. The ends of capillary tubing 20 are connected in gas-tight relationship at 23 and 24, e.g. with silver solder, to ⅛ inch stainless steel tubes 25 and 26, which are inlet and outlet conduits, respectively. The capillary tubing 20 is enclosed in a grounded stainless steel housing 11 which is electrically insulating from a stainless steel cover 12 by insulation strip 13 made of silicon rubber. Posts 21 and 22 are welded to housing 11 and electrically insulated from the capillary by insulating sleeves 28 and 29. The insulated posts 21 and 22 are retained in place by insulated bolts 14 and 15 in cover 12.

Liquid fuel or fuel precursor, e.g. $NH_3$ under pressure, passes from a storage tank (not shown) by way of ⅛ inch stainless steel tube 16 through filter 27 and inlet tube 25 into the capillary tube 20. The purpose of the filter is to keep the feed to the capillary free of particles or substances that can form a restriction in the capillary. The type of filter required will depend on the feed. With liquid $NH_3$ as the fuel source, porous (sintered) metal may be used as the filter. Vaporized fuel (or fuel precursor) passes from the capillary 20 to the outlet tube 26. The outlet tube 26 leads to the fuel inlet to the fuel cell (not shown) or fuel generator (not shown) such as a catalytic $NH_3$ dissociator, depending on the particular system.

Electrical terminals 17 and 18 are power connections which place the capillary tubing 20 in electric contact with the fuel cell. Power to the capillary which heats the capillary and serves to control flow is provided by DC power supply (not shown) which senses the fuel cell power demand. Electrical isolation on outlet tube 26 is provided by insulation sleeve 19. The two electric power terminals, one the box and the other on the insulated cover, are placed so that the whole capillary will act as a heater when power is applied. The inlet side of the capillary is in permanent electrical contact with a box, whereas, the other end through its connection with the outlet tube is in contact with the cover. The full single length of the capillary tubing serves as the only electrical path between the box and cover. Relative to the resistance of the capillary, the resistance of box, cover and the leads is negligible.

During operation the temperature of the metering device should not exceed ambient. If liquid $NH_3$ at a pressure of 120 psig is used as the source of the fuel, the liquid will boil at approximately 73° F. Beyond the inlet, the pressure through the capillary will drop steadily toward the outlet end also causing the boiling point temperature to decrease, e.g. 60° F at 93 psig. To maintain a certain ratio of liquid to vapor in the capillary for controlling the flow rate, will require only a modest amount of heat applied in a temperature range close to ambient.

DESCRIPTION OF PREFERRED EMBODIMENTS

In accordance with one aspect of this invention a capillary tube device having a temperature regulating means is provided to deliver fuel feed to a fuel cell system, and the temperature regulating means is activated by the power output of the fuel cell.

One or more capillary tubes may be used, for example, in a bundle or a single tube may be used in a coil. Suitably the capillaries may be made of metal resistant to corrosion by the fluid being metered, e.g. stainless steel. Alternatively the capillaries may be made of non-metallic materials, but in such case the capillary must be heated by an external heat source.

In a preferred embodiment of this invention, the capillary tubes are made of metal and the capillary itself is used as a resistor which is in electrical contact with the power output of the fuel cell. In this system, energy for vaporization is supplied from the power output, which heats the metal capillary. Since the flow resistance of the vapor is greater than that of the liquid (in the case of ammonia, seven times greater), the flow is throttled as the power output increases.

The fuel can be any fluid which is easily transformed from a liquid to vapor phase by applying heat and which will flow freely through a capillary. Examples of fuels are ammonia, propane, butane, methane, liquid $H_2$ or $O_2$, and freon. The fuels may be fed directly to the fuel cell or may be fed to an auxiliary generator, e.g. where a fuel such as a hydrocarbon or ammonia is converted to a $H_2$-containing fuel. The capillary tubing is provided in the system to deliver, when it is at ambient conditions, the amount of fuel to give a predetermined cell output. In operation, the rate of fuel delivery responds to temperature in the capillary, when the temperature is higher less fuel is delivered and thus, since the temperature of the capillary is regulated by the power output of the cell, the output of the cell is automatically controlled.

EXAMPLE

A test unit was constructed in which the capillary tube was a 12 inch sample of 0.060 inch O.D. × 0.006 inch I.D. stainless steel. The capillary tubing was connected on one end with a ⅛ × ¼ inch stainless steel tubing, which served as the fuel inlet. Similarly a ⅛ × 1/16 inch stainless steel tubing was attached to the other end of the capillary to serve as the outlet. Silver solder was used to make air tight connections with the capillary at both ends. Neoprene tubing used as part of the outlet tubing served for electrical isolation from ground. Power input to the capillary tubing was provided from a regulated DC power supply and connected to the capillary by using a fixed lead attached at the inlet to the capillary and an adjustable lead. The adjustable lead was clipped to the capillary at various distances from the inlet to the capillary to provide various heating areas of the metal capillary.

Referring to FIG. 1, the adjustable clip was placed in position A, B, and C. On the capillary tubing 1 position A was 7 ⅛ inches from the inlet, B was 4 ⅜ inches, and C was 2 ⅛ inches. A common ground 4 for all positions of the clip was located at the inlet of the capillary. Liquid ammonia at 120 psig and ambient temperature was admitted to the capillary at the inlet end 2 and the amount of liquid delivered per unit time at outlet end 3 was evaporated and passed through a wet test meter for measurement. At position C, at ambient temperature 7.2 liters per minute of $NH_3$ gas was delivered. By putting in a measured amount of heat at the points shown, the flow rate was altered as follows: 4.43 liters per minute at 1.2 watts and 2.78 liters per minute at 3.75 watts.

Figure 2:
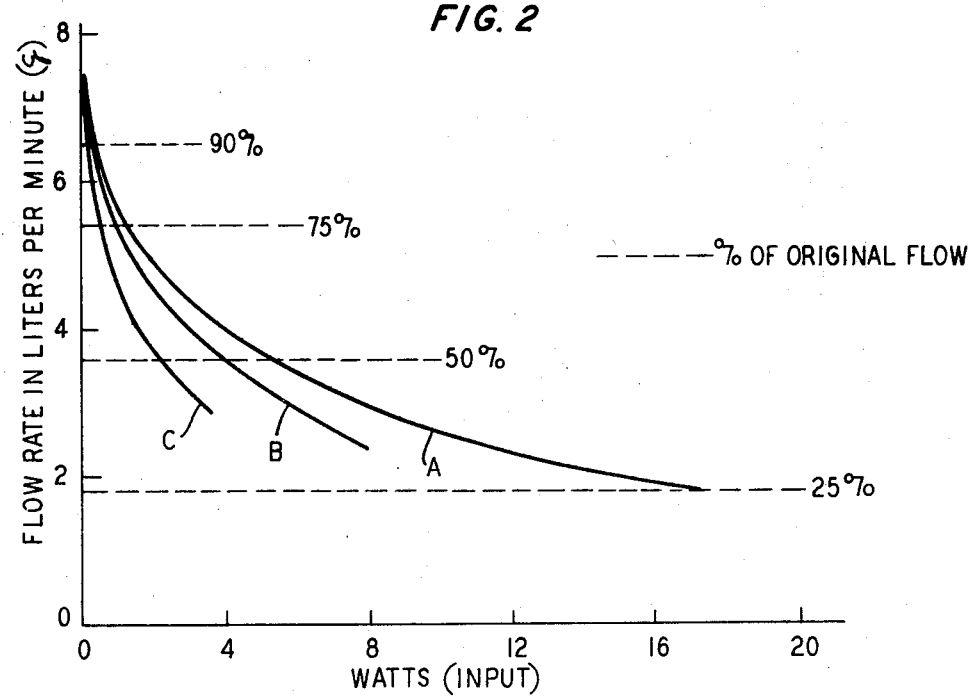
FIG. 2 is a graph which shows the results of a test using the device of FIG. 1.

The results are given graphically in FIG. 2 in which the flow rate in liters per minute (on a gas flow basis) are shown against the power input in watts for each of the positions A, B, and C. The broken lines indicated the % of original flow; for example, at about 1.8 l/min. the flow has been reduced to about 25 percent of the original rate. FIG. 2 shows two characteristics of the device. It shows that at any lead placement the flow can be reduced by applying power, thereby raising the temperature of the capillary. It also shows that the closer the heating to the inlet, the lower the power requirement for a given change. This is because all vaporization is done early in the capillary and the pressure drop (flow restriction) is determined by the distance the vapor must travel in the capillary.

Referring to FIG. 4 it can be easily seen that by short-circuiting part of the capillary 20 to cover 12 the length of the electrical path through the capillary can be adjusted so that heating will occur only in the part of the capillary adjacent to inlet 25.

What is claimed is:

1. In a fuel cell system adapted to provide a predetermined power output and comprising a fuel cell having at least one fuel electrode to which a fuel is fed in a gaseous state, means for controlling the fuel feed to the system which comprises a capillary metal tubing having an inlet and an outlet and which receives pressurized liquid fuel and delivers a predetermined amount of gaseous fuel at ambient temperature to the fuel cell electrode to give the desired power output and means to regulate the temperature of said capillary tubing, the temperature regulating means comprising said capillary tubing electrically connected to the power output of the fuel cell; whereby increase in power output of the fuel cell above the predetermined amount causes the temperature of the capillary tubing to rise, thereby causing vaporization of the fuel and thus decreasing the fuel feed to the fuel electrode.

2. A fuel cell system according to claim 1 wherein the capillary tubing is an electrical resistor, thereby causing the temperature of the capillary tubing to be regulated in response to the power output of the fuel cell.

3. A fuel cell system of claim 1 wherein the outlet of the capillary tubing is connected to an auxiliary hydrogen generator having an effluent comprised of a $H_2$-containing gas and said effluent is fed directly to said fuel electrode.

4. A fuel cell system of claim 3 wherein the fuel is ammonia and said auxiliary hydrogen generator is an ammonia dissociator.

* * * * *